J. B. VAN DYNE.

Fire-Extinguishing Engines.

No. 6,133. Reissued Nov. 10, 1874.

WITNESSES:

G. Matthys.

C. A. Pettit

INVENTOR:

J. B. Van Dyne

BY

ATTORNEYS.

THE GRAPHIC CO. PHOTO-LITH. 39 & 41 PARK PLACE, N.Y.

UNITED STATES PATENT OFFICE.

JACOB B. VAN DYNE, OF LOUISVILLE, KENTUCKY, ASSIGNOR TO THE CHAMPION FIRE-EXTINGUISHER COMPANY, OF SAME PLACE.

IMPROVEMENT IN FIRE-EXTINGUISHING ENGINES.

Specification forming part of Letters Patent No. 127,390, dated May 28, 1872; reissue No. 6,133, dated November 10, 1874; application filed August 3, 1874.

*To all whom it may concern:*

Be it known that I, JACOB B. VAN DYNE, of Louisville, in the county of Jefferson and State of Kentucky, have invented a new and useful Improvement in Fire-Extinguishing Engines; and I do hereby declare that the following is a full, clear, and exact description of the same, reference being had to the accompanying drawing, forming a part of this specification, in which—

Figure 1:
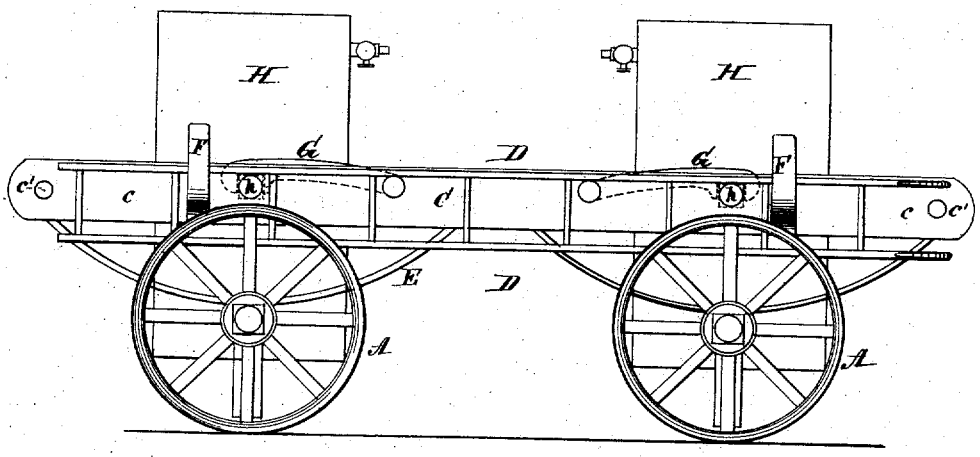
Figure 2:
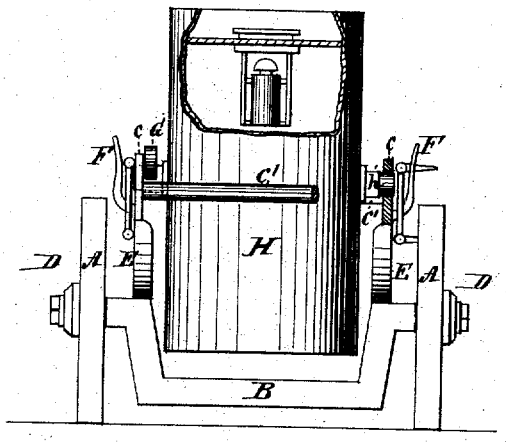

Figure 1 is a side elevation, and Fig. 2 an end view, of my improved fire-engines.

The invention will be first fully described, and then pointed out in the claims.

A represents the wheels, B the downwardly-projecting axles, and C the frame, of a carriage, D. The frame C rests upon four semi-elliptic springs, E, each centrally fastened to axle near the hub. This frame consists of the two sides *c c* and two end pieces, *c′ c′*, which hold the sides together. On these side pieces are placed holders or hooks F, which support, on the outside, ladders, jointed or otherwise, while to the inside of said pieces are pivoted the latches G G. H H are two barrel-shaped vessels or fire-extinguishers, each having a capacity of fifty to one hundred gallons or more, and containing ingredients proportioned and mixed according to my patent, issued April 9, 1872. The ingredients cannot mix, however, except by inverting the cylinders. Then the gases are generated, whose elastic pressure propels the liquid, through the cock and hose, into whatever direction desired. The cylinders H are each provided with trunnions *h h*, having a portion next the cylinder squared, and, at their outer ends, journaled in the sides *c c*, so that they can be easily inverted when necessary. The pivoted latches G are fastened over the square portion of the trunnion *h*, and the cylinders held in position, as shown in the drawing, until the operator is ready to discharge the chemical preparation upon the fire. The hose and pipe are then adjusted, the latches unhooked, the cylinders reversed, and the fire quickly put out.

Having thus described my invention, what I claim as new is—

1. A wheeled vehicle, in combination with one or more vessels, H, pivoted therein to admit of convenient transportation, inversion, and mixture of chemicals, in the manner described.

2. The chemical fire-extinguisher H, pivoted to the sides of a wheeled vehicle, and held in position by latches G, as and for the purpose described.

3. The pieces *c′ c′* of a fire-engine, provided with hooks F on the outside, as and for the pose set forth.

J. B. VAN DYNE.

Witnesses:

SOLON C. KEMON,
CHAS. A. PETTIT.